June 14, 1966

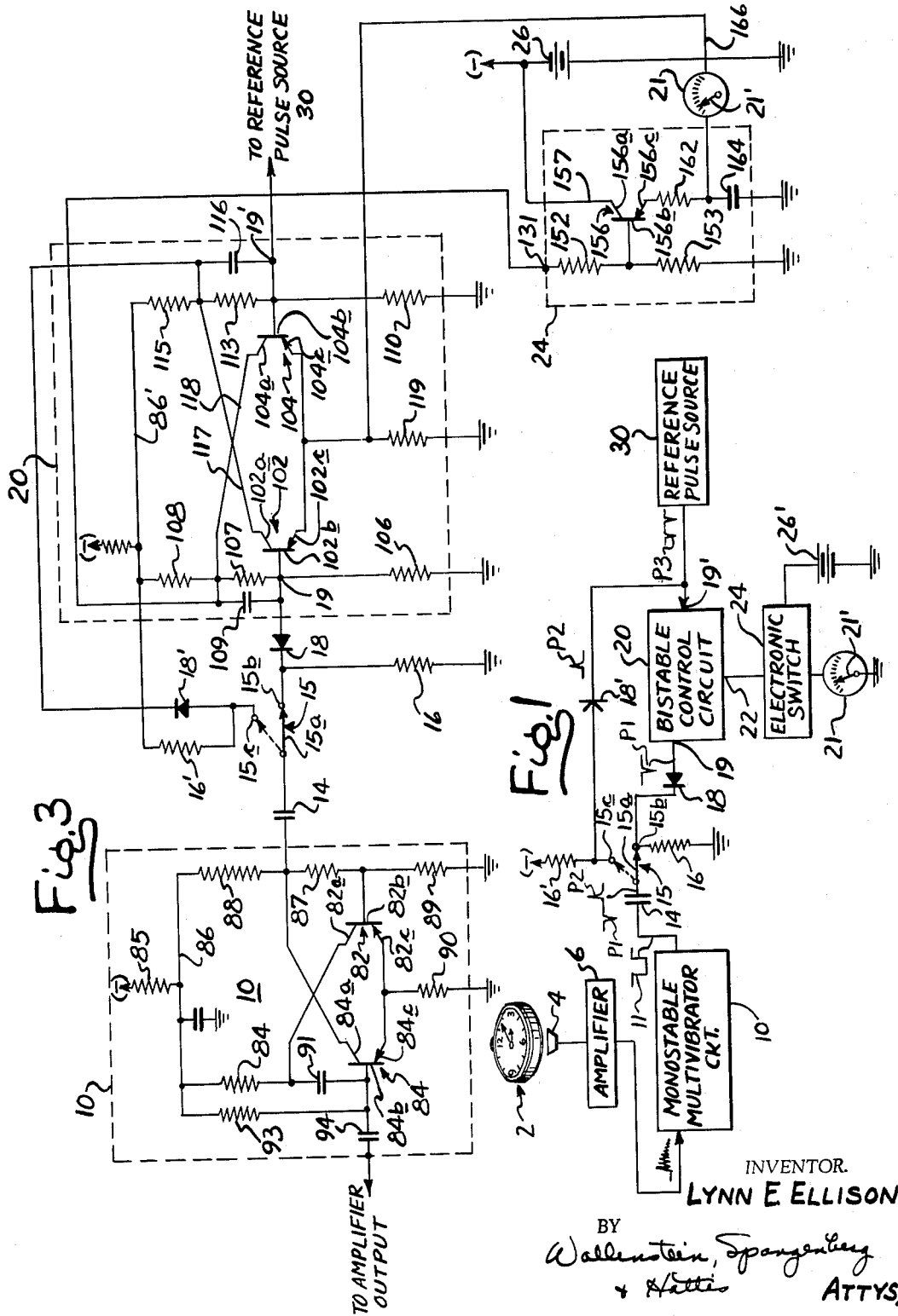

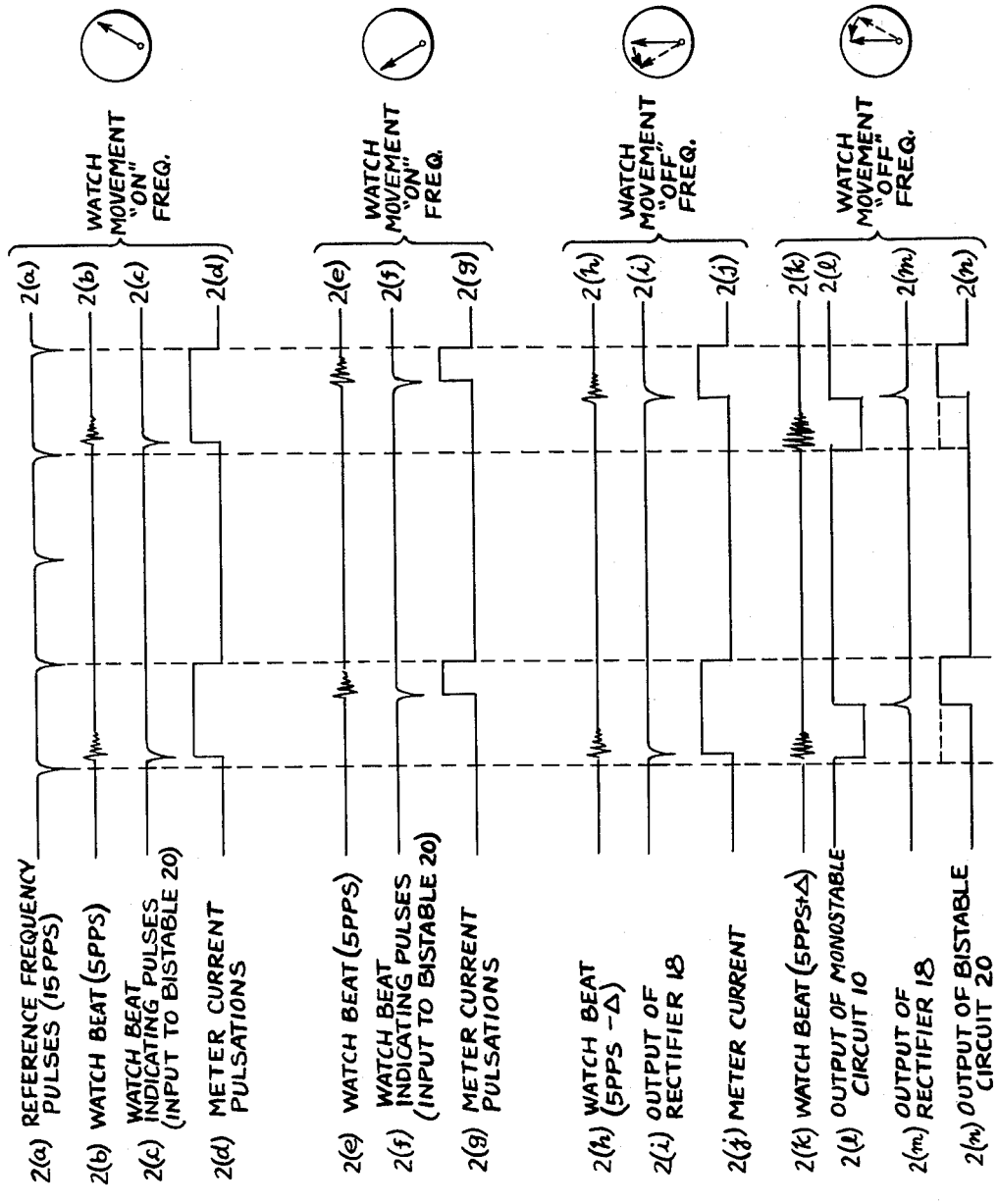

3,255,625
WATCH TESTING APPARATUS
Lynn E. Ellison, 476 Golf Road, Crystal Lake, Ill.
Filed May 22, 1963, Ser. No. 282,502
3 Claims. (Cl. 73—6)

This application is a continuation-in-part of application Serial No. 181,885, filed March 23, 1962, now Patent No. 3,183,706, and deals with apparatus for comparing the beat or oscillation frequency of a watch movement with a reference frequency. The watch testing apparatus of this application is an improvement in the apparatus disclosed in said application Serial No. 181,885.

Watch testing apparatuses of the type which compares the oscillation frequency of a watch movement with a predetermined reference frequency may take numerous forms. One form of such apparatus indicates the "on" and "off" frequency conditions of the watch movement under test by the deflection of the pointer on the current indicating scale of a direct current (D.C.) meter movement. When the oscillation frequency of the watch movement corresponds to the reference frequency, the deflection of the pointer on the face of the meter is constant, and when such relationship is not present, the deflection of the pointer continuously and progressively varies over substantially the entire extent of the scale.

U.S. Patent No. 2,541,286 discloses a watch testing apparatus of the type just described for testing and adjusting the watch balance before it is inserted into a watch movement. A circuit is therein disclosed for controlling the flow of current through the meter movement which circuit utilizes a pair of series connected switches which are respectively mechanically opened and closed by the watch balance and a standard balance in accordance with the oscillation frequencies thereof. There, each of the switches comprises the blade of the hair spring engaging and disengaging a pair of electrically insulated pins which are identical to the curb pins in a watch movement. The standard balance oscillates at the same frequency as the desired oscillation frequency of the watch balance under test. When both switches are simultaneously closed, a D.C. voltage source is connected to the meter movement. When the oscillation frequency of the standard balance corresponds to the oscillation frequency of the watch balance under test, the relative phase of the instants of opening and closing of the series connected switches will remain constant, and current pulses of constant duration pass through the meter movement. The resulting constant deflection of the meter pointer indicates that the watch balance under test is "on" frequency. However, if that relationship does not exist between the oscillation frequencies of the standard balance and the watch balance under test, the relative phase of the instants of the opening and closing of the series connected switches will progressively vary. The resulting progressively varying deflection of the meter pointer indicates that the watch balance under test is "off" frequency. The hair spring of the watch balance is adjusted to the proper length to cause the oscillation frequency of the watch balance to correspond to that of the standard balance, the hair spring is marked and severed at that length, and then the adjusted watch balance is inserted in the watch movement.

The watch testing apparatus disclosed in said application Serial No. 181,885 and in the present application indicates the "on" and "off" frequency conditions of the balance of a watch movement in the general manner above described, and does so without any physical or direct electrical connections between the test apparatus and the watch movement under test or its balance by utilizing a microphone which responds to the audible ticking of the watch or its movement, enabling the test apparatus to be easily and conveniently used by even non-skilled persons.

The electrical signal generated by a microphone responding to the beat of a watch movement comprises a series of spaced signal units representing the various beats of the watch. Each of these signal units comprises contiguous pulsations representing the vibration of one beat of the watch movement. In the preferred apparatus of the present invention, electrical signals are derived from the output of the microphone which are utilized to control the conductive state of an electronic switch controlling the coupling of a current source to a meter movement. The control of the electronic switch is preferably effected through a bistable circuit which is triggered into one state of operation at the beginning of each signal unit of the microphone output. The electronic switch is rendered conductive during this state of the bistable circuit. The bistable circuit is triggered into its opposite state to render the electronic switch non-conductive upon the occurrence of a reference timing pulse derived from the A.C. power line voltage previously referred to.

The proper operation of a timing circuit of the type described above depends in part upon the nature of the signals utilized to trigger the bistable circuit and the relative frequencies or phases of the reference frequency and the narrow range of watch oscillation frequencies expected with the watch movements to be tested. Difficulties can occur, for example, if the duration of the beats of the watch movement overlap two cycles of the reference frequency. Also, the multiple pulses making up each signal unit at the output of the microphone can in some instances cause false multiple triggering of a bistable control circuit to which the signals are fed. In the apparatus disclosed in this and the other application, the output of the microphone which picks up the beats of the watch movement are fed to a pulse shaping circuit which effectively generates a single narrow pulse coinciding with the start of each beat indicating signal unit at the output of the microphone. The subsequent pulsations of each signal unit are eliminated from the input to the bistable circuit. The pulse shaping circuit most advantageously is a monostable multivibrator which provides a square pulse having a duration greater than the longest duration of a beat pulsation expected from the watch movements to be tested. The square wave output of the monostable multivibrator is fed first through a differentiating circuit which provides a pair of pulses of opposite polarity coinciding with the leading and trailing edges of each square wave and then preferably to a rectifier which passes only the pulse which is coincident with the leading edge of each square wave output of the monostable multivibrator. This pulse is fed to one of the inputs of the bistable circuit controlling the aforesaid electronic switch.

When the difference between the frequency of the watch movement under test and the reference timing pulses is small, the pointer on the face of the meter movement moves very slowly. When the pointer is at the extreme ends of the meter face, particularly the end representing a maximum meter deflection, the meter may remain there for a considerable time until the duration of the "on" time determined by the electronic switch is sufficiently small to place the pointer in the middle region of the face of the meter movement, where adjustment of the watch under test can most conveniently be made. As previously indicated, the timing of the watch under test is adjusted so that the pointer remains stationary and it is apparent that this adjustment is most easily made when the pointer is positioned at a point far removed from either extreme of the meter face.

The object of the present invention is to provide a watch testing apparatus preferably of the type disclosed in said application Serial No. 181,885 which is designed so that the operator need not ever wait a long time for the pointer to move from an extreme position on the face of the meter movement to the center thereof.

In accordance with the most preferred form of the invention, the duration of each square wave produced by the above mentioned monostable multivibrator is adjusted so that it is in the neighborhood of one-half the maximum duration of the state of operation of the bistable circuit referred to above which effects current conduction to the meter movement. A single pole double throw manual switch is connected between the output of the monostable multivibrator circuit and the aforesaid input to the bistable circuit at the point between the differentiating circuit and the rectifier. In one position of the manual switch, the circuit is arranged in the manner previously described. In the other position of the manual switch, the output of the differentiating circuit is connected through a rectifier which passes only the pulse which is coincident with the trailing edge of the square wave involved, such pulse being spaced from the other pulse by about one-half said maximum duration of the aforesaid state of operation of the bistable circuit. The latter pulse is fed to the other input of the bistable circuit to reverse the state of operation of the bistable circuit at an instant which will then start a new phase of the bistable circuit operation which will automatically place the meter pointer in the center of the meter face.

These and other objects, features and advantages of the invention will become apparent upon making reference to the specification to follow, the claims and the drawings wherein:

FIG. 1 is a simplified block diagram of an electrical circuit illustrating the watch testing equipment of the present invention;

FIGS. 2(a) through 2(n) are timing diagrams of some of the current and voltage waveforms in the circuit of FIG. 1 for different conditions of the watch under test; and FIG. 3 is a detailed circuit diagram of a portion of the circuit shown in block form in FIG. 1.

Referring now to FIG. 1, the watch under test, which is generally indicated by reference numeral 2, is clamped in place or otherwise held adjacent to a conventional microphone 4 which generates electrical signals corresponding to the vibrations of each beat or tick of the watch movement 2. The electrical output of the microphone representing the vibrations of a single beat of the watch is indicated by the waveforms of FIGS. 2(b), 2(e), 2(h) and 2(k) for different beat conditions to be described. These waveforms comprise contiguous alternating pulsations which cease at the end of each beat or tick of the watch. These beat indicating waveforms reoccur at the beat frequency of about five beats per second in most watches.

The electrical output of the microphone 4 is fed to an amplifier 6 which produces an amplified signal corresponding to the waveform of the watch beat. The amplifier output is fed to one of the control inputs of a monostable or "one shot" multivibrator 10 which is thereby triggered from a stable reset or reference state to an unstable state by the first of the pulsations of each beat indicating signal received from the amplifier 6. The multivibrator 10 remains in its unstable state for a fixed predetermined period, depending upon the time constant of the circuit involved, such time period being purposefully designed to be greater than the longest duration beat indicating signal expected from the watch movements to be tested. The monostable multivibrator then returns to and stays in its reset or reference state until it receives the next beat indicating signal from the amplifier 6. The output of the monostable mutivibrator circuit 10 illustrated in FIG. 1 has a negative going square wave portion 11 with relatively steep leading and trailing edges. The duration of this negative going portion 11 has a predetermined duration to be described which is important to the operation of the present invention.

The output of the monostable multivibrator 10 is connected to a capacitor 14 which, in conjunction with a resistor 16 or 16' differentiates the square waveform to produce a negative going pulse P1 across resistor 16 or 16' at the leading edge of the negative going square wave portion 11 and a positive pulse at P2 at the trailing edge thereof. A single pole double throw manual switch 15 is connected to the output side of the capacitor 14 selectively to connect the capacitor 14 to the resistors 16 or 16'. To this end, the movable pole or contact 15a of the switch 15 is connected to the capacitor and the stationary contacts 15b and 15c are respectively connected to one of the ends of resistors 16 and 16', the other ends thereof being respectively connected to ground and a source of negative voltage. The former ends of the resistors 16 and 16' are respectively connected to the cathode of a rectifier 18 and the anode of a rectifier 18'. The anode of the rectifier 18 is connected to one of the control inputs 19 of a bistable circuit so that all the negative pulses coinciding with the leading edges of the negative going portions of each monostable circuit square wave will trigger the bistable circuit into a state of operation which will pass current through a meter movement 21 having a pointer 21' on the scale-containing face thereof. The cathode of the other rectifier 18' is connected to the other control input 19' of the bistable circuit 20 so that all the positive pulses coinciding with the trailing edges of the negative going portions of each monostable circuit square wave will trigger the bistable into the last mentioned state of operation. In effect, the switch 15 determines whether the leading or trailing edge of the monostable circuit output will trigger the bistable control circuit to control the duration of the current flow through the meter movement 21 at the instant the switch 15 is operated. If, for example, the duration of current flow through the meter movement 21 is such that the pointer 21' of the meter movement is at a maximum deflection, operation of the switch 15 (say from contact terminal 15b to 15c) would automatically cut the duration of current flow through the meter about in half so that the pointer 21' will be in the center portion of the meter face.

When the bistable circuit 20 is in the state which is to effect current flow through the meter movement 21, an output voltage appears at an output terminal 22 which is coupled to an electronic switch 24 which is thereby rendered conductive. Direct current (D.C.) from a source of direct current voltage 26 is then fed to the meter movement 21. The electronic switch 24 remains in a conductive state until the bistable circuit 20 is reset.

A reference pulse source 30 for supplying reference frequency pulses for resetting the bistable circuit 20 is provided. This source 30 may be any suitable source of precisely timed pulses, such as the pulse forming circuit disclosed in said application Serial No. 181,885. The reference pulse source 30 in the circuit illustrated in FIG. 1 generates negative pulses P3 at a pulse repetition rate which bears an integral numerical relation to the desired watch beat frequency (five beats per second), such as fifteen cycles per second. These pulses are fed to the control input 19' of the bistable circuit 20 to reset the same.

The manner in which the circuit shown in FIG. 1 operates to indicate the "on" and "off" frequency conditions of the watch under test is best understood by an explanation of various waveforms in the circuit as shown in FIGS. 2(a) through 2(n).

The various waveforms shown in FIGS. 2(a) through 2(n) are drawn on a common time scale and illustrate the operation of the circuit shown in FIG. 1 for several different operating conditions. FIG. 2(a) illustrates the reference frequency pulses (fifteen pulses per second) fed to the input 19' of bistable circuit 20. FIGS. 2(b) through 2(d) illustrate various waveforms controlled by the beat of the watch where the latter is "on" frequency, namely a frequency of five beats per second. FIGS.

2(e) through 2(g) are waveforms corresponding to FIGS. 2(b) through 2(d) for an "on" frequency condition where the phase of the watch beats is different from FIG. 2(b), and FIGS. 2(h) through 2(n) represent the corresponding waveforms for an "off" frequency condition.

Refer first to the "on" frequency condition illustrated in FIGS. 2(b) through 2(d). FIG. 2(b) shows the five pulses per second watch beat indicating signals at the output of the amplifier 6. As there shown, each beat comprises a number of contiguous vibrations or pulsations. FIG. 2(c) shows the negative pulses resulting from the differentiated square wave output of the monostable circuit 10 fed to the input 19 of the bistable circuit 20 which pulses are coincident with the beginning of the beat indicating signals of FIG. 2(b). FIG. 2(d) shows the periods of conduction of the electronic switch 24, which are initiated by the beat indicating pulses of FIG. 2(c) and terminated by the next occurring reference pulses of FIG. 2(a). Since the reference pulse frequency of fifteen pulses per second bears an integral numerical relationship with respect to the beat frequency of the watch 2, the relative phase between the beat indicating pulses of FIG. 2(c) and the reference pulses of FIG. 2(a) will remain constant, so that the conduction intervals of the electronic switch 24 will remain constant. The pointer 21' of the meter 28 will then have a substantially constant deflection. The meter movement is preferably fairly heavily damped so that the pointer 21' will remain fairly stationary with only a small noticeable oscillation.

FIG. 2(e) illustrates the amplified watch beat indicating signals occurring at five signals per second where the watch beats have a later phase relationship with respect to the reference frequency pulses shown in FIG. 2(b) and thus the conduction intervals of the electronic switch 24 are decreased accordingly. The deflection of the pointer 21' of the meter 21 will be less than that present under the conduction of FIGS. 2(b) through 2(d), but the deflection will remain substantially constant, indicating the "on" frequency condition of the watch 2. FIGS. 2(f) and 2(g) show respectively the beat indicating pulses resulting from these watch beats which initiate conduction of the electronic switch 24 and the current pulsations through the meter movement resulting therefrom.

FIG. 2(h) illustrates the amplified beat indicating signals for a situation where the watch is "off" frequency. Under these circumstances, it is apparent that the relative phase between the beat indicating signals and the reference frequency pulses of FIG. 2(a) will vary with time. Accordingly, the duration of the conduction intervals of the electronic switch 24 for successive watch beat pulsations will vary as indicated, so that the deflection of the pointer 21' will vary progressively with time.

As previously indicated, when the difference between the frequency of the watch movement under test and the reference pulses is small, the pointer 21' on the face of the meter movement 21 moves very slowly. When the pointer is at the extreme ends of the meter face, the meter may remain there for a considerable time until the duration of the "on" time determined by the electronic switch is of a value which places the pointer in the middle region of the face of the meter movement, where adjustment of the watch under test can most conveniently be made.

It will be assumed that the maximum possible duration of the state of the bistable circuit which effects conduction of the electronic switch will cause the pointer 21' to be at its maximum deflection point on the meter face, and the negative going portion 11 of the output of the monostable circuit 10 is in the neighborhood of half this duration as illustrated in FIG. 2(b). FIG. 2(k) illustrates the condition where the watch beat is slightly different from the desired five signals per second and the phase thereof relative to the reference pulses is such that the meter current pulsations are near their maximum value.

If the movable contact 15a of the manual switch 15 is then on stationary contact 15b where the negative pulses coincident with the leading edges of the monostable negative square wave output, the pointer 21' can be immediately positioned in the center portion of the meter face by changing the position of the movable contact 15a so it engages stationary contact 15c when the positive pulses coincident with the trailing edge thereof will trigger the bistable circuit 20. The same action results when the switch position is reversed when the pointer 21' of the meter movement is at a minimum position.

Refer now to the circuit diagram of FIG. 3 which illustrates a preferred circuit for the monostable multivibrator circuit 10, bistable circuit 20 and the electronic switch 24 shown in block form in FIG. 1. Corresponding elements in FIGS. 1 and 3 have been indicated by similar reference numerals. The monostable multivibrator 10 may be a conventional transistor "one shot" multivibrator including two transistors 82 and 84 of the PNP type. The collector electrode 82a of the transistor 82 is connected through resistors 84, common negative line 86 and resistor 85 to the negative terminal of a source of direct current voltage (not shown) having its positive terminal grounded. The base electrode 82b of the transistor 82 is connected through series connected resistors 87 and 88 to the line 86. A resistor 90 is connected between the emitter electrode 82c of the transistor 82 and ground.

A capacitor 91 is connected between the collector electrode 82a of the transistor 82 and the base electrode 84b of the transistor 84. The collector electrode 84a of the transistor 84 is connected through a resistor 88 to the negative line 86. The emitter electrode 84c of the transistor 84 is connected to the ungrounded side of the resistor 90. The transistor 84 is initially biased into a highly conducted stable state by the connection of the base electrode 84b of transistor 84 through a resistor 93 to the negative line 86. The resulting negative voltage on the base electrode 84b will render the transistor 84 normally highly conductive. The resulting negative voltage developed across the resistor 90 used in common with the emitter circuit of the transistors 82 and 84 will bias the transistor 82 to a non-conductive condition. The base electrode 84b of the transistor 84 is coupled through a capacitor 94 to the output of the amplifier 6. The watch beat indicating signal at the output of the amplifier will be assumed to be a positive going signal.

The first positive pulse of the beat indicating signal appearing at the base electrode 84b of the transistor 84 will render the transistor 84 non-conductive. This will result in a sudden reduction of the negative voltage at the ungrounded end of resistor 90 which enables transistor 82 to conduct under the bias condition present at that time. The resulting drop in the voltage at the collector electrode 82a of transistor 82 is in a direction to maintain the non-conduction of transistor 82 until the capacitor 91 is substantially changed to the new voltage conditions, whereupon transistor 82 regains conduction which returns the transistor to its initially stable non-conductive condition.

The period during which the monostable multivibrator circuit 10 is in its unstable state is longer than the longest expected duration of each watch beat vibration, so that subsequent pulses of each beat indicating signal will have no effect on the multivibrator circuit 10 and is approximately equal to one-half the duration of the current pulse which causes full scale deflection of the meter pointer 21'.

The voltage waveform on the collector electrode of transistor 84 comprises a single negative going square wave for each beat indicating signal fed to the input of the monostable multivibrator circuit 10 and this point of the monostable multivibrator circuit is connected to the input side of capacitor 14.

As previously indicated the capacitor 14 is connected to the movable pole 15a of the switch 15 which selects whether the differentiated and rectified signal is fed to control input 19 or 19' of the bistable circuit 20.

The terminal 19 of the bistable circuit 20 is connected to the base electrode 102b of a PNP type transistor 102 forming part of the bistable circuit 20. This bistable circuit 20 has two stable states rather than one as in the case of the monostable multivibrator circuit 10. The bistable circuit 20 has another PNP type transistor 104. The base electrode 102b is connected to one end of a resistor 106 whose opposite end is connected to ground. The ungrounded end of resistor 106 is connected through series connected resistors 107 and 108 to a negative line 86'. A capacitor 109 is coupled in parallel with the resistor 107. The base electrode 104b of the transistor 104 is connected to one end of the resistor 110 whose opposite end is connected to ground. The ungrounded end of resistor 110 is connected to the negative line 86' through series connected resistors 113 and 115. A capacitor 116 is connected across the resistor 113. The collector electrode 102a of the transistor 102 is connected by a conductor 117 to the juncture between resistors 113 and 115. The collector electrode 104a of the transistor 104 is connected by a conductor 118 to the juncture between resistors 107 and 108. The emitter electrodes 102c and 104c of the transistors 102 and 104 are connected through a common resistor 119 to ground. As is common in bistable transistor circuits of this type, when one of the transistors is highly conductive, the resulting bias conditions on the base electrode of the other transistor will render the latter transistor non-conductive. The conductive and non-conductive conditions of the two PNP transistors are reversed whenever a negative pulse is fed to the base electrode of a non-conductive transistor or a positive pulse to the base electrode of a conductive transistor.

The rectifier 18' connected to the stationary contact 15c of the switch 15b is connected to the base electrode 104b of transistor 104 through capacitor 116. Control terminal 19' of the bistable circuit is shown connected directly to the base electrode 104b of transistor 104.

As previously indicated, the bistable circuit 20 is normally in a reset condition effected by the feeding of a negative reference frequency pulse to the input 19' of the bistable circuit 20, and the bistable circuit is triggered into the opposite state by a negative beat indicating pulse fed to the input 19 of the bistable control circuit. The output of the bistable circuit 20 in FIG. 3 is taken at the collector electrode 104a of the bistable transistor 104. To this end, an output line 130 connecting with line 118 extends to the input terminal 131 of the electronic switch 24. The signal appearing on the line 130 has a negative going portion having a duration depending upon the relative phase of the beat indicating pulse last fed to the bistable circuit and the next reference frequency pulse. Depending upon the condition of the watch movement, the voltage waveform at the output terminal 22 will resemble the waveforms shown in FIGS. 2(d), 2(g), 2(j) or 2(n) but of inverse polarity to that shown therein.

The input terminal 131 of the electronic switch 24 is connected to one end of a resistor 152 whose other end is connected to the base electrode 156b of a PNP transistor 156 forming part of the electronic switch 24. A resistor 153 is connected between the base electrode 156b and ground. The collector electrode 156a of transistor 156 is connected to a negative line 157 leading to the negative terminal of a D.C. battery 26 or other D.C. source whose positive terminal is grounded. The emitter electrode 156c of the transistor 156 is connected by a resistor 162 to a grounded filter capacitor 164. The meter movement 21 is connected between the juncture of capacitor 164 and resistor 162 and a line 166 leading to the ungrounded side of resistors 119 of the bistable circuit 20 which provides a bias for the transistor 156.

In the reset state of the bistable circuit 20, the transistor 104 will be highly conductive and the voltage conditions on the base electrode 156b of transistor 156 resulting from the low negative voltage coupled thereto by conductor 130 from the collector electrode 104a of the transistor 104 will render the transistor 156 non-conductive. When the bistable circuit 20 is triggered into its opposite state by a watch beat indicating signal, the resulting non-conduction of the transistor 104 will result in a highly negative voltage coupled thereto from the collector electrode 104a on the base electrode 156b which causes the transistor 156 to conduct heavily until the bistable circuit is reset in the manner explained.

To summarize the operation of the invention, when a watch 2 is held adjacent the microphone 4, an accurate beat frequency of the watch movement will be indicated by a substantially constant deflection of the meter pointer 21'. An imperfect beat frequency of the watch movement will be indicated by a progressively varying deflection of the pointer 21' over the face of the meter. If the meter pointer 21' should be at either extreme of the meter face making it difficult to make a timing adjustment, the movable pole 15a of switch 15 is moved from the stationary contact 15b or 15c with which it is in contact to the other of same, and the meter pointer will immediately move to the center portion of the meter face.

The present invention has thus provided a very convenient and easy to use, reliable and accurate means for testing the beat frequency of a watch movement and the symmetry of the watch beats, without the need for any mechanical or electro-mechanical connections to the watch movement under test.

It should be understood that numerous modifications may be made of the preferred form of the invention above described without deviating from the broader aspects of the invention.

What I claim as new and desire to protect by Letters Patent of the United States is:

1. Watch testing apparatus for comparing the beat frequency of a watch movement with that of a reference frequency, said apparatus comprising: means for detecting the beat of a watch movement and providing beat indicating control signals at a frequency and phase corresponding to the beats of the watch movement under test, means providing a source of reference control signals at a fixed predetermined frequency, the ratio of the frequency of one of the reference control signals and the correct beat frequency of the watch movement to the other of same being a whole number, an electrical meter movement having a meter face with a pointer movable between extreme positions thereof, a source of electrical energy for said device, switch means for coupling and uncoupling said source respectively to and from said device, and switch operating bistable control means having respective states triggered respectively by said beat indicating and reference control signals, and, in one of said states, operating said switch means to initiate the coupling of said source of electrical energy to said measuring device, and, in the other of said states, operating said switch means to decouple said source of electrical energy from said measuring device, manually operable means for introducing a fixed predetermined phase change between the beat indicating and reference control signals to vary the duration of said one state of said bistable control means instantaneously, to move the pointer from either of its extreme positions to an intermediate position, a constant indication of said measuring device indicating a correct beat rate of the watch movement under test and a fluctuating indication of said measuring device indicating an imperfect beat rate of the watch movement.

2. Watch testing apparatus for comparing the beat frequency of a watch movement to that of a reference frequency, said apparatus comprising means for detecting the beat of a watch movement and providing signals corresponding to the frequency and phase of the beats of the watch movement under test, square wave generator means responsive to each of said signals for providing a single square beat indicating control signal of a given duration, means providing a source of reference control signals at a fixed predetermined pulse repetition rate, the ratio of the higher of the frequency of the reference control signals and the desired beat rate of the watch movement to the other of same being a whole number, a meter movement having a pointer indicating the current flow through the meter movement, a source of energizing current for said meter movement, electronic switch means for coupling and uncoupling said source of current respectively to and from said meter movement, and switch operating bistable control means for operating said switch means to initiate the coupling of said source of energizing current to said meter movement in one state thereof, and operating said switch means to decouple said source of energizing current from said meter movement in the other state thereof, manual switch means having a first position for triggering said bistable control means into said one state at an instant coincident wtih the leading edge of each of said square beat indicating signals and a second position for triggering said bistable control means into said one state at an instant coincident with the trailing edge of each square wave indicating signal, and means responsive to said reference control signals for operating said bistable control means in said other state, the duration of said square wave being in the neighborhood of one-half the duration of said one state of the bistable control means which effects movement of the meter movement position to its maximum extreme position, wherein operation of said switch from one position to another introduces a fixed predetermined phase change between the instants said beat indicating and reference control signals are operable on the bistable control means to bring the meter movement pointer into a central position.

3. Watch testing apparatus for comparing the beat frequency of a watch movement with that of a reference frequency, said apparatus comprising: means for detecting the bead of a watch movement and providing beat indicating control signals at a frequency corresponding to the beats of the watch movement under test, square wave generating means responsive to each of said signals for generating a square signal of a given duration, differentiating, means for differentiating said square signal and providing narrow beat indicating control pulses of opposite polarity coinciding respectively with the leading and trailing edges of each square signal, an electrical meter movement having a meter face with a pointer movable between extreme positions thereof, a source of electrical energy for said device, switch means for coupling and uncoupling said source from said device, and switch operating bistable control means having a first control signal input terminal for triggering said bistable control means into one state when pulses of one polarity are fed thereto and a second control signal input terminal for triggering said bistable control means into said one state when receiving control pulses of an opposite polarity, means coupling said reference control signals to said bistable control means to trigger the same into the other state thereof to reset the same, first rectifier means connected to the output of said differentiating means for passing only the control pulses of said one polarity and second rectifier means for passing only the control pulses of the opposite polarity, manually operable means including a manual switch for coupling the control pulses of said one polarity at the output of said first rectifier means to said first control signal input terminal in one position thereof and for coupling the control pulses of said other polarity at the output of said second rectifier means to said second control signal terminal in the other position thereof, the given duration of said output of square signal being in the neighborhood of one-half the duration of said one state of the bistable control means which effects movement of the meter movement pointer to its maximum extreme position, wherein operation of said switch from one position to another introduces a fixed predetermined phase change between the control pulses operable on the bistable control means to bring the meter movement pointer into a central position.

No references cited.

DAVID SCHONBERG, *Acting Primary Examiner.*